Dec. 9, 1969  W. J. POHL  3,483,350
ELECTRON BEAM DETECTION AND STEERING SYSTEM
Filed April 25, 1968  4 Sheets-Sheet 1

Inventor:
Walter J. Pohl,
by His Attorney.

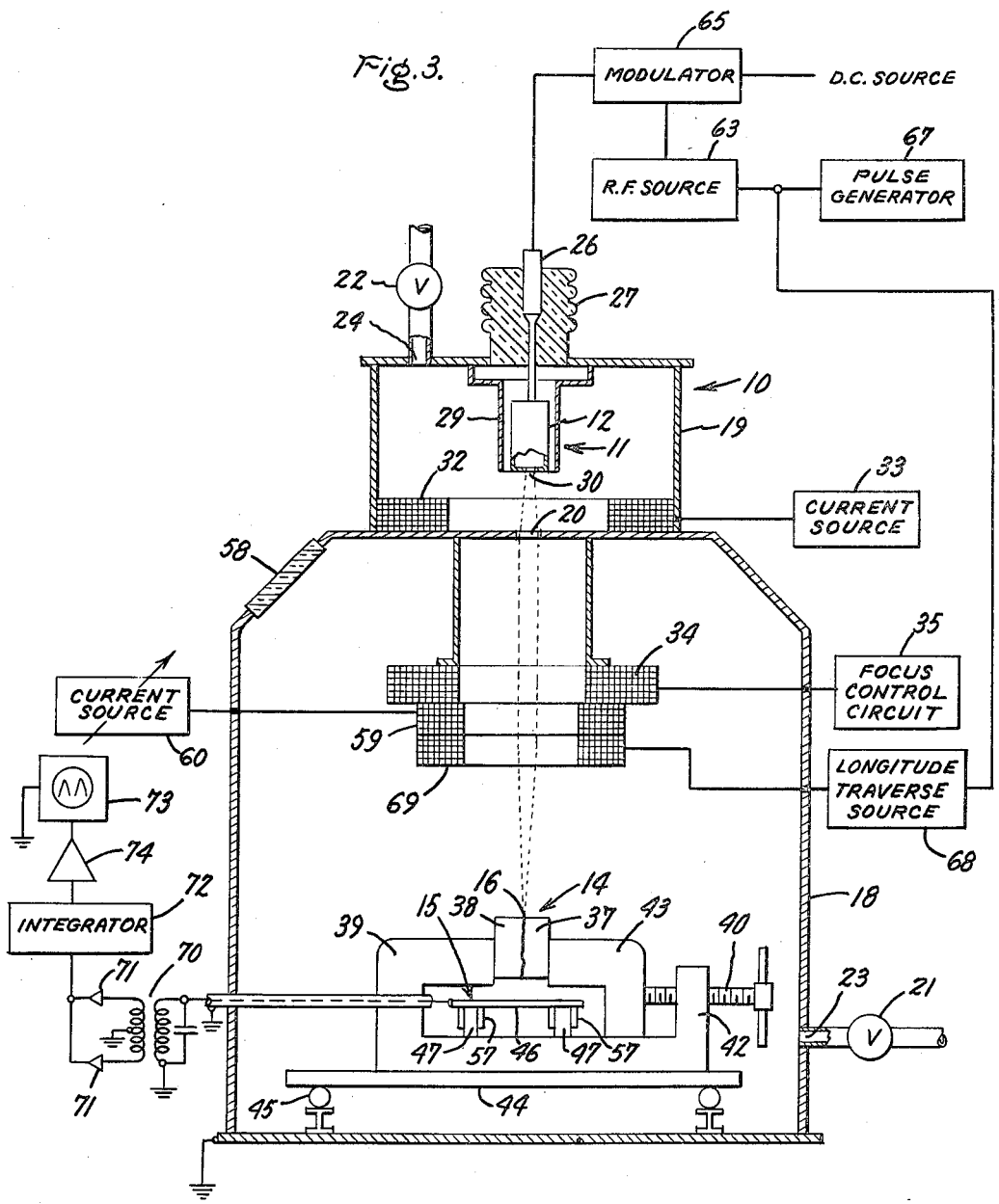

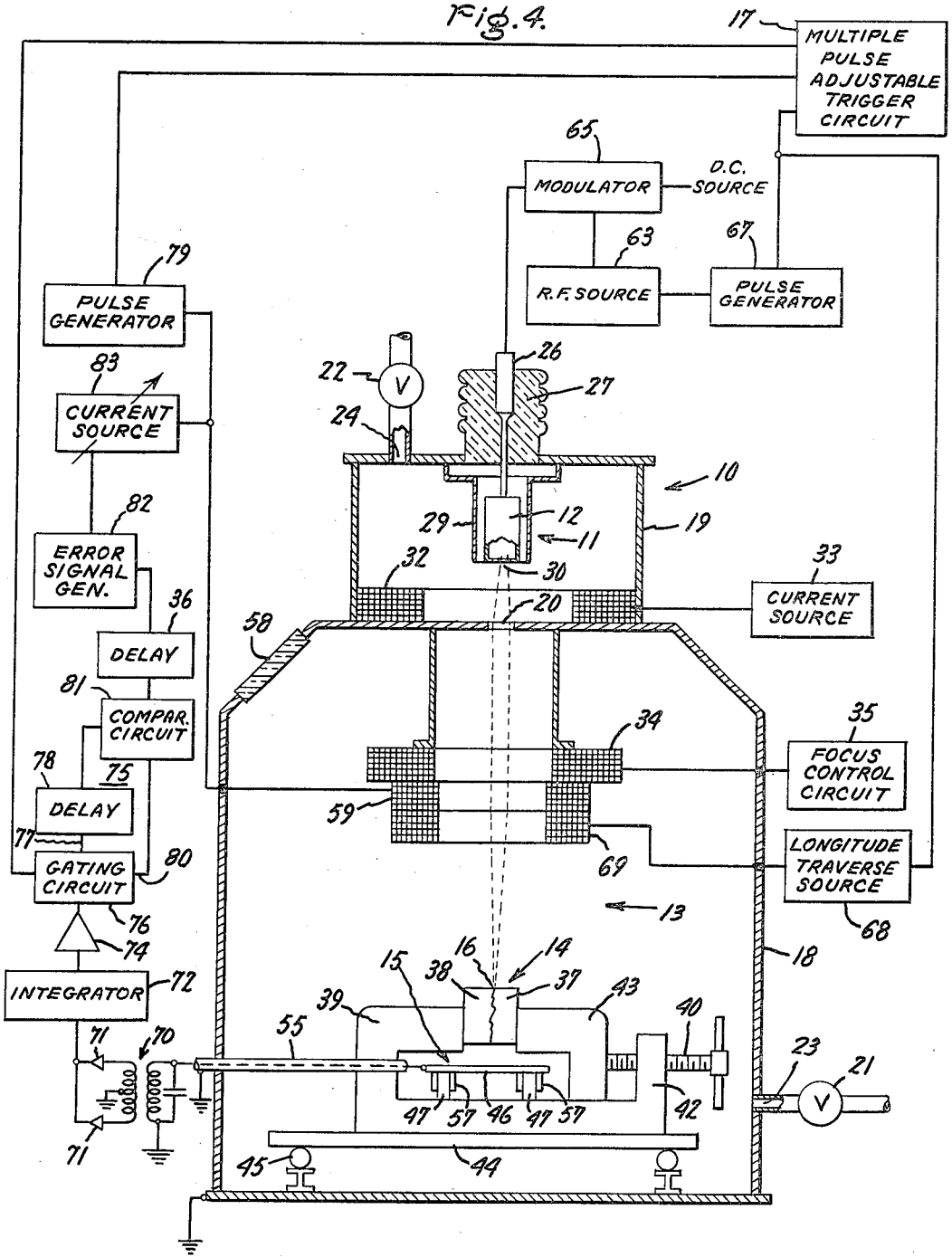

Inventor:
Walter J. Pohl,
by *His Attorney.*

United States Patent Office 3,483,350
Patented Dec. 9, 1969

3,483,350
ELECTRON BEAM DETECTION AND STEERING SYSTEM
Walter J. Pohl, Schenectady, N.Y., assignor to General Electric Company, a corporation of New York
Filed Apr. 25, 1968, Ser. No. 724,070
Int. Cl. B23k 9/00
U.S. Cl. 219—121        8 Claims

ABSTRACT OF THE DISCLOSURE

Alignment of an electron beam with the joint of a workpiece to be butt-welded is achieved utilizing an electrically insulated conductive plate positioned downstream of the beam relative to the workpiece to intercept electrons passing through the workpiece joint. To align the electron beam with the joint prior to the initiation of welding, a low energy beam is traversed in a direction perpendicular to the longitudinal direction of the workpiece joint and the quantity of electron beam impingement upon the conductive plate is amplified and detected by suitable means, e.g. an oscilloscope, permitting alignment of the electron beam with the workpiece joint at the point of maximum detectable signal. Beam alignment during welding also can be achieved employing the conductive plate detector by traversing the beam parallel to the feed direction of the workpiece during welding thereby producing an error signal for automatic correction of the beam location relative to the moving workpiece.

THE DISCLOSURE

Figures 1, 2:
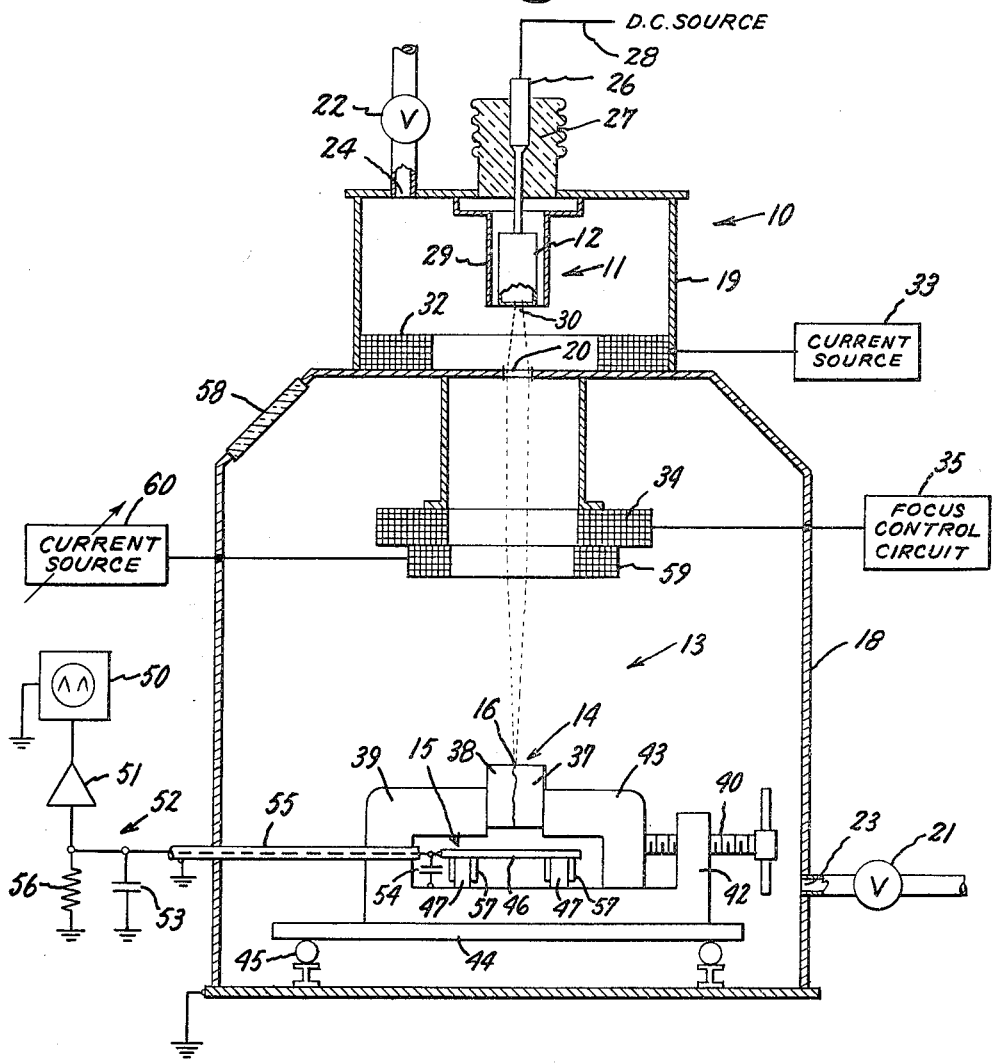

This invention relates to electron beam welders and methods of positioning the beam therein relative to the workpiece to be welded. More particularly, electron beam welders in accordance with this invention are characterized by a conductive plate underlying the workpiece joint to detect alignment of the electron beam relative to the joint.

In recent years electron beam welding, e.g. welding by electron beam penetration into a joint formed by two juxtaposed materials, has been increasingly utilized by metal fabricators because of the high efficiency of the process, the limited heat damage produced in the materials being joined and the minimum machining required to finish the relatively small weld produced. To achieve sound, deep welds however, the joint of the materials being welded must be carefully aligned with the focal point of the electron beam utilizing complicated techniques, often tending to negate much of the economic advantage associated with electron beam welding. Among the sophisticated systems presently in use to align the electron beam with a joint being welded are both optical methods wherein the position of the beam is visually observed to permit adjustment of the joint relative to the beam position, and electronic methods wherein the electron beam focal position is accurately detected by beam traversals relative to electron sensors situated at precisely known locations and the workpiece joint subsequently is aligned with the detected focal point. The latter method, however, generally is deficient because time consuming procedures are required to align accurately the workpiece joint with the known location of the beam focal point while optical methods are subject to inaccuracies because of the generally high tolerances associated with visual observation. Nor do these prior methods overcome well-known problems associated with beam deflection resulting from magnetic effects and also workpiece distortion resulting from thermal expansion.

Another method of beam alignment presently utilized is by mechanical means wherein the gun is positioned relative to some mechanical reference surface. This method, however, does not permit the compensation in alignment required for variations in dimensional tolerances during fabrication of the workpiece.

It is therefore an object of this invention to provide an electron beam welder having an electronic detection system capable of rapidly aligning the workpiece joint with the electron beam.

It is also an object of this invention to provide an electron beam welder having automatic positioning control of the electron beam relative to the joint being welded.

It is a further object of this invention to provide an electron beam welder capable of highly accurate beam alignment during welding.

It is a still further object of this invention to provide an electron beam welder having a simply constructed, rugged detection system.

It is also an object of this invention to provide a novel method of electron beam alignment both prior to, and during, welding.

These and other objects of this invention generally are achieved by positioning a conductive plate downstream of the electron beam relative to the workpiece to measure the intensity of electrons passing through the fissure, e.g. the crack in a unitary workpiece or the joint formed by juxtaposed bodies, to be welded. Thus, for example, an electron beam welding device in accordance with this invention would include an electron beam source for the welding of a longitudinal fissure in a workpiece and means for focusing the generated electron beam upon the workpiece fissure. A conductive plate employed to detect alignment of the beam with the workpiece fissure is situated along the axial plane of the beam at a location downstream of the beam relative to the workpiece and suitable means are provided for detecting the intensity of the electrons passing through the fissure and impinging upon the conductive plate. When employed to initially align the workpiece prior to welding, preferably a low intensity beam is traversed perpendicular to the longitudinal direction of the fissure in the workpiece, e.g. traversed perpendicular to the feed direction of the workpiece during welding, and the beam is positioned at the location producing maximum output signal from the conductive plate. Because automatic alignment of the electron beam with the fissure during welding requires a location of fissure points prior to the advent of the points at a welding site, beam alignment during welding is accomplished by sweeping the beam forward of the weld site in a direction parallel to the feed direction of the workpiece to obtain an error signal proportional to the fissure alignment with the workpiece motion. The error signal then is fed back to the electron beam deflection coils, or the workpiece motive means, to regulate the relative position of the beam upon the workpiece fissure. To obtain an enlarged error signal while limiting damage to the workpiece, the beam traversals during welding preferably are offset perpendicular to the feed direction by a distance less than the width of the electron beam upon the workpiece with the direction of offset varying for a forward traversal relative to the return traversal.

Figure 7:
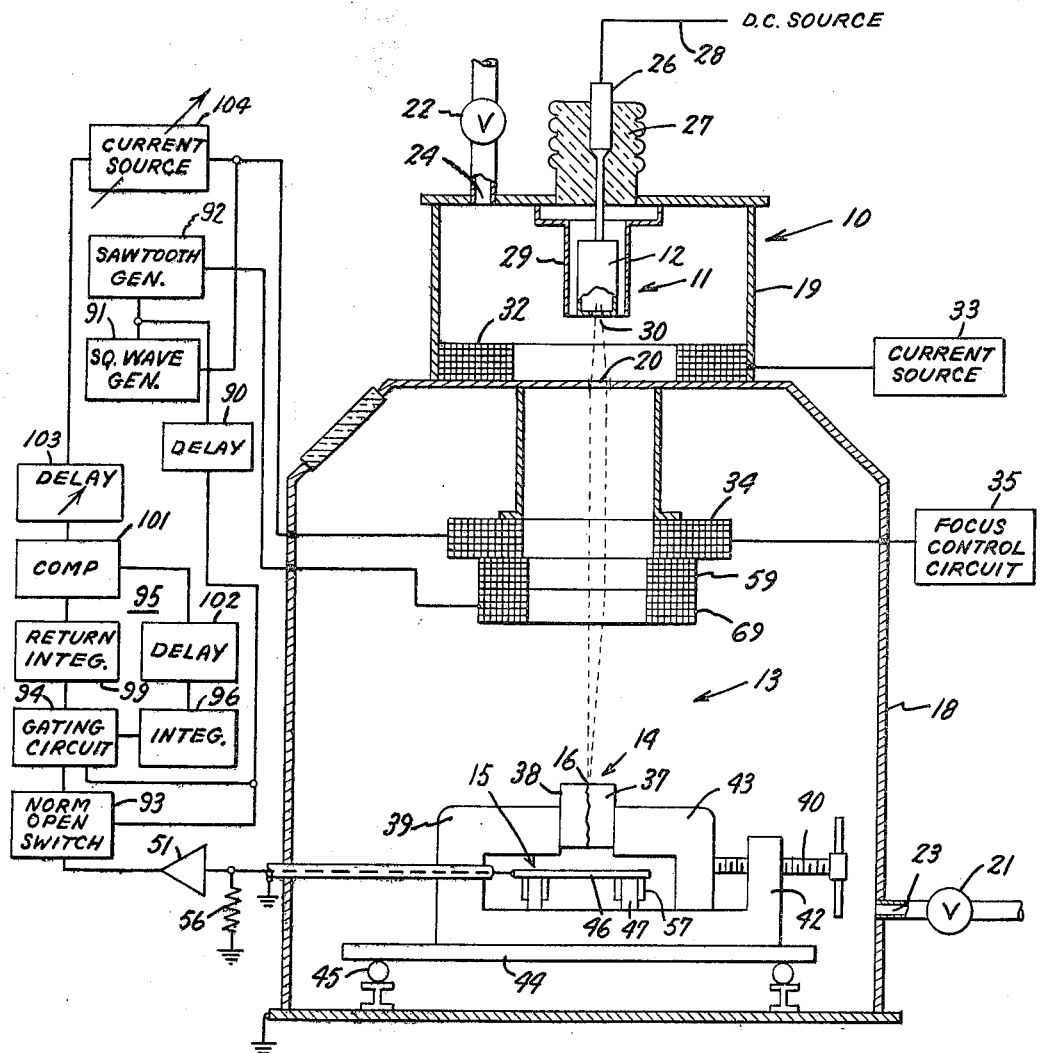
Figure 5:
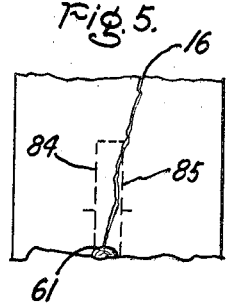
Figure 6:
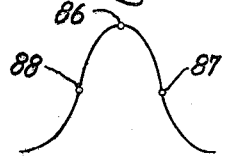
Figure 8:
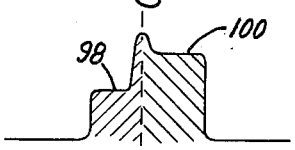

The novel features believed characteristic of the invention are set forth in the appended claims. The invention itself, together with further objects and advantages thereof may best be understood by reference to the following description, taken in connection with the accompanying drawings, in which:

FIGURE 1 is a sectional view of an electron beam welder having an alignment control in accordance with this invention, FIGURE 2 is an enlarged view depicting an electron beam traversal path for alignment during welding, FIGURE 3 is a sectional view of an electron beam welder depicting, in block diagram form, circuitry for utilization with the beam traversal path of FIGURE 2, FIGURE 4 is a sectional view of an electron beam welder depicting, in block diagram form, circuitry permitting automatic beam alignment during welding, FIGURE 5 is an enlarged view depicting an alternate traversal path of the electron beam to permit alignment during welding, FIGURE 6 is a pictorial illustration of an electron beam intensity curve, FIGURE 7 is a sectional view of an electron beam welder depicting, in block diagram form, circuitry suitable for utilization with the traversal path of FIGURE 5, and FIGURE 8 is a waveform illustrative of the output signal produced by an electron beam traversal in accordance with FIGURE 7.

An electron beam welder 10 constructed in accordance with this invention is depicted in FIGURE 1 and generally includes a gun chamber 11 containing a cathode 12 for the generation of an electron beam, a work chamber 13 wherein the butt welding of a workpiece 14 is to be accomplished and a detection system, generally identified by reference numeral 15, to determine the alignment of the electron beam with the joint 16 of workpiece 14. The entire welder generally is enclosed to permit pressure control of the individual chambers therein with a housing 18 serving to confine work chamber 13 and a second housing 19 mounted atop housing 18 serving to enclose gun chamber 11. An apperture 20 is centrally disposed in the top of housing 18 in axial alignment with the electron beam generated by cathode 12 to permit passage of the electron beam therethrough while being of narrow diameter to limit gaseous exchange between the work chamber and gun chamber. Thus, diffusion pump 21, in communication with orifice 23 in the sidewall of work chamber housing 18, can maintain the work chamber at a pressure less than 500 microns for welding workpiece 14, while diffusion pump 22 connected to orifice 24 in the gun chamber housing can function to maintain the gun chamber at a substantially lower pressure, e.g. $10^{-4}$ to $10^{-5}$ torr, for prolonged cathode life.

While any suitable electron beam source, e.g. a plasma source or a thermionic source, can be employed in accordance with this invention, a plasma source such as is depicted in FIGURE 1 is preferred because of the relatively long operational life of cathodes employed therein and the generally self-collimating beam produced by such sources. Cathode 12 generally is a hollow structure mounted at the lower extremity of conductive rod 26 embedded within insulating bushing 27 to permit suitable external energization of the cathode, e.g. by a 10–60 kilovolt D.C. source, through leads 28 and the conductive rod. Interiorly of gun chamber 11, a grounded sheath 29 fixedly secured to housing 19 extends downwardly to shroud cathode 12, thereby effectively limiting electron discharge to the area of orifice 30 in the bottom of the cathode. The electron stream emitted by the cathode 12 is focused by electromagnetic lens 32, suitably energized with current source 33, to a beam diameter smaller than the diameter of aperture 20 to permit unimpeded passage of the beam into work chamber 13. As the electron beam enters work chamber 13, the slightly diverging beam is again focused by an electromagnetic lens 34 suitably energized by a focus control circuit 35 to impinge upon workpiece 14 in an area preferably less than ¼-inch in diameter, thereby concentrating the welding intensity of the beam at joint 16 of the workpiece. A more complete understanding of electron beam welding structures suitable for employment in this invention can be obtained with reference to Patent No. 3,218,431, issued Nov. 16, 1965, and assigned to the assignee of the present invention.

Workpiece 14 to be welded generally comprises two pieces of material 37 and 38 which are clamped in juxtaposition for butt welding within the jaws of vice 39 by rotation of threaded rod 40 extending through a tapped bore in fixed jaw 42 and contacting moveable jaw 43 of vice 39. The vice is positioned upon a work table 44 situated atop a ball race 45 to permit a feed of workpiece 14 in the longitudinal direction of joint 16 during welding, utilizing suitable drive means (not shown). Similarly, mechanical means (not shown) can be provided to produce a movement of the workpiece perpendicular to the feed direction to permit alignment of the beam with the joint of the workpiece either before or during welding. Preferably vice 39, work table 44 and ball race 45 are metallic, e.g. stainless steel, to effect electrical grounding of the units to housing 18.

A conductive plate 46 is situated below workpiece 14 on the downstream side of the electron beam to intercept any electrons passing through joint 16 of the workpiece. Plate 46 can be any conductive material and preferably is a sheet of stainless steel having a thickness in excess of $\frac{1}{16}$-inch to provide both high conductivity for the electrons impinging thereon and sufficient mechanical strength to inhibit damage from molten metal drippage from the joint during welding. A pair of insulated bushings 47 function as mechanical supports for plate 46 and serve to electrically isolate the plate from the workpiece while positioning the plate at a convenient span from the lower face of the workpiece. The distance between the workpiece and the plate generally is not critical but a spacing of at least ¼-inch is preferred to inhibit possible shorting of the plate to the workpiece by molten metal drippings. Because heat is not a serious problem at the bushing locations within welder 10, any non-contaminating, electrically insulating material can be employed as the insulated bushings, although ceramic materials generally are preferred because of their mechanical strength.

Electron impingement upon plate 46 is amplified and measured by any suitable read-out means such as oscilloscope 50 connected to plate 46 through D.C. amplifier 51 and 60-cycle filter 52 which includes small, e.g. 100 microfarads or less, capacitors 53 and 54 connected at opposite ends of a shielded cable 55 to divert to ground any A.C. components, such as noise, in the output signal from plate 46. Electrons passing through joint 16 and impinging upon plate 46 produce a D.C. current flow to ground through resistor 56, which resistor is of relatively high value, e.g. 1 megohm, to provide a relatively high amplitude voltage signal across the resistor. To assure a minimum D.C. current loss through bushings 47, the combined ohmic value of the bushings should be at least 100-fold the ohmic value of resistor 56. A sheathing 57 encompasses bushings 47 and extends downwardly from conductive plate 46 to within a few mils of vice 39 to inhibit a possible deposition of an electrically conductive coating on the insulators from the vapors formed during welding.

In the operation of the system of this invention for alignment of joint 16 with the electron beam prior to welding, workpiece 14 is clamped within the jaws of vice 39 and positioned atop work table 44 at a location visually indicating alignment of the beam with joint 16 of the workpiece when observed through port 58 in the upper sidewall of work chamber housing 18. After conductive plate 46 is positioned below the workpiece on the downstream side of the beam, the beam is energized at a low power level, e.g. less than 50% power, and the work table in traversed by suitable means (not shown) in a direction perpendicular to the feed direction of the workpiece to produce a visual signal upon oscilloscope 50 having a maximum intensity when alignment of the beam with the joint is achieved. The work table then is locked to inhibit further motion in the traversed direction whereupon the beam is raised to welding intensity and the workpiece is fed in the longitudinal direction of joint 16 to effect a sound, deep weld in the workpiece.

Alternately, the traversal of workpiece 14 relative to the electron beam can be effected by deflection coil 59 when suitably energized by adjustable current source 60 to traverse the electron beam in a direction perpendicular to the feed direction of the workpiece. After the output of current source 60 is set at a location providing a maximum output signal from plate 45 upon oscilloscope 50, welding can be commenced by raising the beam to welding intensity.

In general, the intensity of the signal produced by plate 46 is dependent both upon the intensity of the beam impinging upon workpiece joint 16 and the fit of the abutting faces forming the joint. Tolerable high points remaining in the faces after machining generally provide a span of 0.001–0.002 inch along the majority of joint 16 through which span a 20 kilovolt beam at 47 milliamperes is readily able to penetrate to produce an output current of approximately $8 \times 10^{-9}$ amperes through one megohm resistor 56. The voltage across resistor 56, e.g. approximately 8 millivolts, is well within the capabilities of conventional 50–60 db amplifiers to produce an observable signal on oscilloscope 50. Amplifiers having higher amplification factors or a plurality of amplification stages can be utilized when the fit of the abutting faces of workpiece 14 or the power level of the electron beam produces a smaller output signal from plate 46.

To align joint 16 of the workpiece with the electron beam during welding, the electron beam preferably is periodically scanned for a short time interval parallel to the feed direction of the workpiece, as depicted in FIGURE 2, with feedback circuitry, such as is depicted in FIGURE 3, being employed for beam alignment. Because the weld puddle 61 formed during welding inhibits electron impingement upon conductive plate 46, to obtain a readable signal from the conductive plate and to sense a variation of a point along joint 16 from an aligned location relative to the beam prior to the arrival of the point at a welding position, the electron beam must be swept forward of the weld puddle, e.g. along path 62, by a distance adequate to avoid the puddle while allowing the electrons to strike the conductive plate for a sufficient period to produce a readable signal from the plate. This can be done using the circuitry of FIGURE 3 wherein an R.F. source 63, e.g. a 50 kc. source, is connected to a modulator 65 to modulate the D.C. energization of cathode 12 upon intermittent triggering of source 63 by pulse generator 67. Alternatively, the R.F. source can be connected to the control electrodes in guns employing these electrodes for beam regulation.

The output of pulse generator 67 also is fed to a longitudinal traversal source 68 connected to deflection coil 69 to deflect the beam parallel to the longitudinal direction of joint 16, e.g. in the direction of workpiece feed arrow 70 of FIGURE 2, simultaneously with the application of the R.F. modulated signal to electron gun 12. Because the diameter of weld puddle 61 is typically ⅛-inch, the forward sweep of the electron beam in the feed direction of the weld should be greater than 3/16-inch to assure passage of electrons through the portion of joint 16 forward of the weld puddle.

Application of a modulated pulse to cathode 12 produces an electron beam from the cathode containing an R.F. component which component can easily be isolated from noise and other common interference during welding by tuned circuit 70. Thus the modulated beam, when swept forward of weld puddle 61 by longitudinal deflection coil 69, impinges upon plate 46 to produce a signal capable of being detected by circuit 70 tuned to the frequency of R.F. source 63. The output of tuned circuit 70 then is rectified by rectifiers 71 before being integrated in integrating circuit 72 to produce a signal proportional to the intensity of the modulated beam impinging upon plate 46 (and therefore proportional to the alignment of the immediately forward portion of joint 16 with the feed direction of the workpiece). After amplification in D.C. amplifier 74, the output from the integrating circuit 72 is fed to an oscilloscope 73 to produce a visual signal indicative of the uncorrected alignment of the forward portion of the workpiece joint with the welding beam. The magnitude of the output signal on oscilloscope 73 is a maximum when the beam is correctly aligned, and continuous manual adjument may be made in source 60 to deflect the electron beam in such a way as to maximize the display signal.

Preferably the electron beam is swept by source 68 less than 5% of the welding cycle to prevent thermal degradation of the workpiece being welded with a search to a weld period of 50 to 1, or less, generally being desired. Thus the output signal from pulse generator 67 which initiates both the sweep of the beam by deflection coils 69 and the application of R.F. source 63 to cathode 12 should have a pulse width of 5%, or less, the pulse generator period.

As will be seen with reference to FIGURE 2, when joint 16 generally is aligned with the feed direction on the workpiece (and therefore underlies the traversed electron beam), the R.F. modulated electrons from cathode 12 can pass through joint 16 and impinge upon plate 46. When joint 16 is disposed angularly relatively to the sweep direction of the electron beam however, a portion of the swept electron beam is intercepted by the workpiece and the magnitude of the signal displayed by oscilloscope 73 is diminished with the signal diminution generally being proportional to the angular disposition of the joint relative to the feed direction of workpiece 14. Visual observation of the signal on oscilloscope 73 thus permits a manual adjustment of current source 60 to deflect the beam by an amount required to maintain the beam in alignment with the joint to be welded.

While the circuitry of FIGURE 3 is effective to indicate a future nonalignment of the beam with the joint of the workpiece to permit correction, the direction of nonalignment is not electrically indicated. Automatic directional control of the electron beam however can be obtained employing suitable circuitry, for example the circuitry of FIGURE 4. Here the amplified signal from tuned circuit 70 is fed to a beam positioning circuit, generally identified by reference numeral 75, rather than being visually displayed as in FIGURE 3. Thus an initial sweep of the R.F. modulated electron beam by deflection coil 69, when initiated by the simultaneous application of a pulse from multiple pulse trigger circuit 17, e.g. Hewlett Packard pulse generator Model 214A, to pulse generator 67 and longitudinal traversal source 68, effects electron impingement upon conductive plate 46 proportional to the alignment of joint 15 with the swept beam and the R.F. component of the signal from plate 46 is isolated by tuned circuit 70. After recitification, integration, and amplification in circuits 71, 72 and 74 respectively, the output from tuned circuit 70 is applied through a gating circuit 76, e.g. a bistable multivibrator triggered to a first mode by trigger circuit 17, to produce an output signal on terminal 77 which signal is applied to delay circuit 78. Thus, synchronism between the application of the R.F. modulated source to cathode 12 and the ination of operation of positioning circuit 75 is achieved by trigger circuit 17 connected to both pulse generator 67 and gating circuit 76. Upon an initial complete traversal of the electron beam, e.g. a forward traversal along path 62 and a return to weld puddle 61, pulse generator 79 is activated by trigger circuit 17 to produce a waveform which is applied to coil 59 to deflect the beam perpendicular to the workpiece feed direction by a fixed amount, e.g., preferably less than 10 mils, for the period of a single complete electron beam traversal by source 68. The beam traversal process then is repeated to pass the deflected beam along a path slightly offset relative to the first traversal. Thus a second output signal from triggering circuit 17 is fed to source 68 to traverse the deflected beam parallel to the longitudinal direction of joint 16 and the R.F. component of the modulated signal produced by electron impinging upon plate 46 again is isolated by tuned circuit 70. After being rectified by rectifiers 71 and integrated by circuit 72, the signal is amplified and fed to gating circuit 76 which circuit is triggered by circuit 17 to be in an operational mode opposite the mode of the circuit during the initial sweep of the beam. Thus, the signal produced by the deflected modulated beam traversal is produced on output terminal 80 of gating circuit 76 and is applied as one input to comparator circuit 81. The output signal from gating circuit 76 during the initial sweep of the undeflected beam also is fed to comparator circuit 81 at this time through delay circuit 78 to produce an output pulse from the comparator circuit indicative of the difference between the two signals applied to the comparator circuit, e.g., indicative of the relative alignment of the joint 16 with the beam during the initial undeflected sweep and the subsequent deflected sweep. The output signal from comparator circuit 81 then is applied to a delay circuit 36 having a delay period, e.g., 0.1 second, sufficiently long to allow the weld spot to travel to the location along the joint where the alignment was detected, e.g. the midpoint of path 62, before being fed to error signal generator 82 to provide a suitable voltage correction for variable current source 83 (e.g. a cathode follower circuit) connected to deflection coils 59. Thus the circuitry of FIGURE 4 requires two or more traversals of the electron beam, e.g. on initial undeflected traversal to obtain a signal indicative of the magnitude of the displacement required and at least one subsequent deflected traversal to obtain a signal indicative of the directional correction required.

In order to inhibit thermal degradation of the workpiece during the beam traversals, the beam traversal speed should be rapid relative to the feed of workpiece 14 under the beam. In general, a beam traversal speed at least 100-fold that of work table 44 is required to assure minimum damage to the workpiece during beam alignment. Similarly, traversal of the deflected beam should occur immediately after deflection of the beam by pulse generator 79. Thus, longitudinal traversal source 68 should produce two closely spaced traversal pulses of relatively short period, e.g. 1 millisecond, separated by an approximately 100-fold greater interval, e.g. 200 milliseconds, from the occurrence of the next set of beam traversal pulses.

To achieve automatic beam alignment without R. F. modulation of the electron gun current source, an elongated off-center sweep of joint 16 can be employed to obtain a signal plate 46 of a magnitude which can be easily compared and readily isolated from noises. A preferred mode of beam sweep to effect this result is shown in FIGURE 5 wherein the beam is deflected from joint 16 in a direction perpendicular to the feed direction of the workpiece with the direction of deflection relative to joint 16 varying for a forward traversal relative to a return traversal. Thus, the beam is first deflected to the left of the joint during a forward traversal 84 by an amount less than the beam diameter and then deflected to the right of the joint by an equal amount during a return traversal 85 to provide two signals for comparison to determine the direction of slope of the joint relative to the beam. Because the point of maximum beam intensity, identified by reference numeral 86 in FIGURE 6, is not situated upon a perfectly aligned joint during traversals of the deflected beam, degradation of the edges of the joint (which edges often are not of uniform thickness) is inhibited and a large variation in the output signal from plate 46 is obtained as the location of joint 16 varies relative to the sharply inclined portion of the intensity curve. Thus, during the forward sweep 84 of the beam when the beam is deflected toward the left in FIGURE 5, a portion 87 of the beam having a fractional intensity of traversal beam center 86 impinges initially upon joint 16 and as the beam is traversed parallel to the feed direction of the workpiece, the intensity of the electron beam impingement upon joint 16 diminishes with the angular slope of the joint from an aligned position. After a traversal for a sufficient distance, e.g. ⅛-inch or more, the electron beam is deflected to the right to traverse a path 85 and return to the weld puddle 61. During the return traversal, point 88 of fractional beam intensity generally is incident upon an aligned joint. However, because joint 16 slopes sharply to the right in FIGURE 5, points of greater beam intensity, e.g. point 86, also impinge at various intervals upon joint 16 to greatly magnify the intensity of electron impingement upon plate 46 during the return traversal.

A deflected forward and reverse electron beam traversal can be effected utilizing circuitry of the type depicted in FIGURE 7 wherein a square wave generator 91 connected to electromagnetic coil 59 functions to deflect the beam to the right and left during beam traversals parallel to the feed direction of the workpiece. The output signal from generator 91 also is employed to activate sweep generator 92, e.g. a sawtooth generator, to produce an output signal which is applied to longitudinal deflection coils 69 to traverse the beam in a direction parallel of the workpiece feed direction. The output signal of sawtooth generator 92 has a period equal to the period of square wave generator 91 to effect a forward traversal of the beam during the positive half-cycle of square wave generator 91 when the beam is deflected to the left while permitting a beam return to an undeflected location during the negative half-cycle of square wave generator 91 when the beam is deflected to the right of the workpiece feed direction. The output signal from square wave generator 91, after a slight delay in delay circuit 90 until the beam has cleared the molten zone of the weld, also is employed to activate a normally open switch 93 and gating circuit 94 to initiate operation of the sensing circuitry, generally identified by reference numeral 95.

During the forward traversal 84 of the beam, e.g. the positive half-cycle of square wave generator 91, a portion of the electron beam passes through joint 16 and produces a D.C. voltage across resistor 56 proportional to the intensity of the electron beam impingement upon conductive plate 46. The voltage produced across resistor 56 is fed through amplifier 51, switch 93 and gating circuit 94, e.g. a monostable multivibrator operating in its initial mode, to a forward traversal integrator 96 which functions to sum the output signal from plate 46 during the interval of the forward traversal of the beam thereby producing voltage signal 98 of FIGURE 8. Upon a termination of forward traversal 84, the negative half-cycle of square wave generator 91 switches the beam to the right of an aligned location and the beam is returned to weld puddle 61 by way of path 85. With the initiation of the return traversal, gating circuit 94 switches to its alternate mode and electrons impinging upon plate 46 are fed through switch 93 and gating circuit 94 to return traverse integrator 99 to produce a voltage signal 100 proportional to the quantity of electron impingement upon plate 46 during the return traversal. The output from return traverse integrator 99 then is compared in comparator 101. e.g. a subtraction circuit, with the output signal from forward traverse integrator 96 which has been delayed in delay circuit 102 for the interval required for the return traversal of the beam, e.g. less than 100 milliseconds, to produce an output signal from comparator circuit 101 proportional to the difference in magnitude between the signals produced by the integrating circuits for the forward and return electron beam traversals. The output from subtraction circuit 101 then is applied to an adjustable time delay circuit 103 whose function it is to delay the corresponding deflection signal long enough to allow the weld spot to travel to the place where the comparison between the two circuit levels of FIGURE 8 was made. This time delay will depend on the speed of traverse of the work table, or the gun in a moving gun system, and will correspond to approximately the midpoint of the rectangular traversal path shown in FIGURE 5. This delay, typically would be 0.1 second if the traverse speed is 1″ per second and the rectangle in FIGURE 5 is ⅜-inch long.

The error signal from delay circuit 103 finally is applied to variable current source 104 (for example cathode follower circuitry) connected to deflection coils 59. Because of the large changes in output signal inherently obtained by elongated traversals of a sharply sloping portion of the electron beam in a direction of an aligned joint, e.g. as depicted in FIGURE 5, the output signals produced by integrators 96 and 99 can be easily compared to obtain a beam alignment correctional signal without the requirement of electron beam R.F. modulation. Although the output signal from square wave generator 91 is employed in the circuitry of FIGURE 7 to initiate the operation of sawtooth generator 92, switch 93 and gating circuit 94, in actual practice a commercially available multiple pulse adjustable triggering circuit, such as circuit 17 of FIGURE 4, may be employed to initiate operation of these circuits because of the ease with which the relative phase of the individual triggering pulses can be adjusted.

While the invention has been described with respect to certain specific embodiments, it will be appreciated that many modifications and changes may be made without departing from the spirit of the invention. I intend, therefore, by the appended claims, to cover all such modifications and changes as fall within the true spirit and scope of my invention.

What I claim as new and desire to secure by Letters Patent of the United States is:

1. In an electron beam welding device characterized by a source for the generation of an electron beam, a fissured workpiece to be welded and means for focusing said generated electron beam upon the fissure of said workpiece, the improvement comprising a conductive plate positioned proximate and insulated from said workpiece, said conductive plate being situated along the axial plane of said electron beam at a location downstream of said beam relative to said workpiece to absorb electrons passing through the fissure in said workpiece, means for detecting the intensity of electron impingement upon said conductive plate and means responsive to the output signal from said detecting means for aligning said beam with the fissure in said workpiece.

2. An electron beam welding device according to claim 1 further including means for producing relative motion between said beam and said workpiece to effect an electron beam traversed across said workpiece at a generally perpendicular attitude relative to the longitudinal direction of the fissure in said workpiece.

3. An electron beam welding device according to claim 1 wherein said fissure is the joint formed by two materials being butt welded.

4. An electron beam welding device comprising an electron beam source, a workpiece having a fissure therein, means for focusing the electron beam generated by said source upon said workpiece fissure, a conductive plate situated along the axial plane of said electron beam at a location downstream of said beam relative to said workpiece, means for intermittently traversing said electron beam relative to said workpiece, means for detecting electron beam impingement upon said conductive plate and means responsive to said detecting means for aligning said electron beam with the fissure of said workpiece being welded.

5. An electron beam welding device according to claim 4 wherein said electron beam is traversed in a direction parallel to the feed direction of said workpiece under said electron beam during welding.

6. An electron beam device according to claim 5 wherein said beam traversals are offset perpendicular to said feed direction by a span less than the width of said beam upon said workpiece, the direction of offset varying for a forward traversal of the beam relative to the return traversal of the beam.

7. A method of positioning an electron beam upon a fissure in a workpiece to be welded comprising scanning said electron beam relative to said fissure in a direction to produce impingement of at least a portion of said beam upon said fissure, intercepting electrons passing through said fissure and positioning said electron beam relative to said workpiece at a location producing maximum electron passage through said fissure.

8. A method of positioning an electron beam according to claim 7 wherein said electron beam is scanned forward of a welding location and said electron beam positioning is delayed until the scanned portion of the fissure arrives at a welding location.

References Cited

UNITED STATES PATENTS

| | | | |
|---|---|---|---|
| 1,869,351 | 7/1932 | Lincoln | 219—60 |
| 2,723,845 | 11/1955 | Przybylski et al. | 318—20.155 |
| 2,987,610 | 6/1961 | Steigerwald | 219—121 |
| 3,016,449 | 1/1962 | Steigerwald | 219—117 |
| 3,112,391 | 11/1963 | Sciaky | 219—121 |
| 3,165,619 | 1/1965 | Cohen | 219—121 |
| 3,335,254 | 9/1967 | Vilkas et al. | 219—60.1 |

JOSEPH V. TRUHE, Primary Examiner

W. DEXTER BROOKS, Assistant Examiner